United States Patent
Emmert et al.

(10) Patent No.: US 6,334,160 B1
(45) Date of Patent: Dec. 25, 2001

(54) APPARATUS AND METHOD FOR PROVIDING MULTIPLE PROTOCOLS THROUGH A COMMON CONNECTOR IN A DEVICE

(75) Inventors: James R. Emmert, Boise; Mark D. Montierth, Meridian, both of ID (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/239,512

(22) Filed: Jan. 28, 1999

(51) Int. Cl.[7] .................................................. G06F 13/00
(52) U.S. Cl. ................................ 710/11; 710/31; 710/105
(58) Field of Search .................................... 710/11, 8, 14, 710/15, 104, 105, 106, 1, 31

(56) References Cited

U.S. PATENT DOCUMENTS

| | | | |
|---|---|---|---|
| 5,457,784 | 10/1995 | Wells et al. | 395/829 |
| 5,535,371 | 7/1996 | Stewart et al. | 395/500 |
| 5,654,739 | * 8/1997 | Sakai et al. | 345/134 |
| 5,671,376 | 9/1997 | Bucher et al. | 395/309 |
| 5,781,028 | 7/1998 | Decuir | 326/30 |
| 5,784,581 | 7/1998 | Hannah | 395/290 |
| 5,799,196 | 7/1998 | Flannery | 395/750.03 |
| 5,903,777 | * 5/1999 | Brief | 395/880 |
| 5,935,224 | * 8/1999 | Svancarek et al. | 710/63 |
| 5,964,852 | * 10/1999 | Overton | 710/62 |
| 6,040,792 | * 3/2000 | Watson et al. | 341/100 |
| 6,058,441 | * 5/2000 | Shu | 710/100 |
| 6,098,120 | * 8/2000 | Yaotani | 710/16 |
| 6,141,719 | * 10/2000 | Rafferty et al. | 710/131 |

FOREIGN PATENT DOCUMENTS

| | | |
|---|---|---|
| 0843263 A1 | 11/1997 | (EP) . |
| 0890905 A2 | 12/1997 | (EP) . |
| 0883083 A1 | 6/1998 | (EP) . |
| 1014055 A2 | 12/1999 | (EP) . |
| 2339043 A | 2/1999 | (GB) . |

OTHER PUBLICATIONS

WO 00/14644 A1 Aug. 27, 1999 Ericsson.
WO 95/34065 A2 Jun. 5, 1995 Intel.
WO 95/22862 A1 Feb. 8, 1995 Telebit.
Lucent Technologies; Silicon Suite for Universal Serial Bus Products & Services Overview; May, 1998; pp. 1–13.

* cited by examiner

Primary Examiner—Thomas Lee
Assistant Examiner—Rijue Mai

(57) ABSTRACT

There is disclosed a configuration for multiplexing the USB signals onto the IEEE 1284 signals thereby allowing a single connector on the device to support either protocol. Within the device, each protocol block is connected to transceiver to compensate for differences in driver/receiver characteristics for the protocol. The outputs of the transceivers are connected to a signal conditioner to allow proper selection of termination impedance. A controller senses whether a passive adapter is attached to the connector. When the passive adapter is not connected the controller selects the 1284 protocol and its associated transceiver and signal conditioning. If the passive adapter is connected, the controller selects the USB protocol and its associated transceiver and signal conditioning. The passive adapter connects pre-selected pins on the device's connector to a USB connector. There is also described an arrangement to allow the passive adapter and device to provide USB hub functions.

11 Claims, 7 Drawing Sheets

APPARATUS AND METHOD FOR PROVIDING MULTIPLE PROTOCOLS THROUGH A COMMON CONNECTOR IN A DEVICE

FIELD OF THE INVENTION

The present invention relates to data communications and more particularly to multiplexing the USB signals onto the IEEE 1284 signals allowing a single connector on a device to support both communication protocols.

BACKGROUND OF THE INVENTION

Numerous types of communication links and communication protocols are used to interconnect devices and allow interconnected devices to communicate with one another. This has become true with connections between a computer and its peripheral devices such as printers, scanners, backup tape drives, modems, keyboards, mouse, and others.

First to appear was the RS-232 serial communication. The RS-232 serial communication protocol provided adequate communication speeds for relatively slow devices. However, as some devices, such as printers, gained speed, the RS-232 protocol did not provide a reliable link between the computer and the device. A parallel protocol commonly known as centronics was created. The centronics protocol provided adequate communications from the computer to the device, but communication from the device to the computer was very limited. Eventually, the centronics port could not provide the high-speed communication link required. To allow bidirectional communications and higher speed, the IEEE-1284-1994 (*IEEE Standard Signaling Method for Bidirectional Parallel Peripheral interface for Personal Computers*, herein incorporated by reference) communication protocol was developed. At the first layer, or physical layer, the 1284 protocol uses bi-directional data lines; all lines use controlled impedance to allow for higher speed. The 1284 protocol is backwards compatible with the centronics protocol.

Recently, there has been developed yet another protocol for interfacing peripheral devices to the computer known as the Universal Serial Bus (USB) as described in USB Specification Revision 1.0 herein incorporated by reference. At the first layer, physical layer, the USB uses serial data with controlled impedance to achieve a 12 Megabits per second data channel. The USB is not backward compatible with any of the previously mention protocols.

Many of the peripheral devices that communicate to the computer are increasing in speed and decreasing in cost and size. For example, as printers have progressed from 300 dpi to 600 dpi to 1200 dpi, the amount of data has increased 16 fold. Similarly, these same printers have increased from 4 pages per minute to 24 pages per minute. The price and size has remained relatively constant.

To help increase the likelihood that the peripheral device will operate with the large number and widely varying computers, the peripheral device must support several communication protocols. However, at present, this would require several different connectors; RS-232, centronics/1284, and USB for example. This adds additional cost and uses precious printed circuit assembly (PCA) space. Many printers have already added a network option.

Prior to the present invention, there are two ways to support both the centronics/1284 and USB ports. First, as described above, the peripheral designer can design the product with both connectors. Second, the designer may elect to support one on the peripheral and then provide or sell an external active converter.

SUMMARY OF THE INVENTION

In order to accomplish the object of the present invention there is provided an apparatus for providing a first interface and a second interface on a device. The apparatus comprises a connector having a configuration as defined by the first interface. There is also a signal conditioner connected to the connector. A first and second transceivers are connected to the signal conditioner. A first interface protocol block for communication external to the device using a first protocol is connected to the first transceiver A second interface protocol block for communication external to the device using a second protocol is connected to the second transceiver. A passive adapter with a first side adapted to mate with the connector and a second side having a configuration as defined by the second interface.

There is also a controller for sensing the presence of the passive adapter. When the controller senses the absence of the passive adapter, the controller enables the first transceiver and first interface protocol block and configures the signal conditioner for the first interface. In the alternative, when the controller senses the presence of the passive adapter, the controller enables the second transceiver and second interface protocol block and configures the signal conditioner for the second interface.

There is also provided a method for providing a first protocol and a second protocol through a common connector in a device. A protocol selection signal from the common connector is detected. If the protocol signal is present then a first protocol block and a first transceiver are enabled. In the absence of the protocol signal, a second protocol block and a second transceiver are enabled.

DESCRIPTION OF THE DRAWINGS

A better understanding of the invention may be had from the consideration of the following detailed description taken in conjunction with the accompanying drawings in which.

DESCRIPTION OF THE PREFERRED EMBODIMENT

Figure 1:
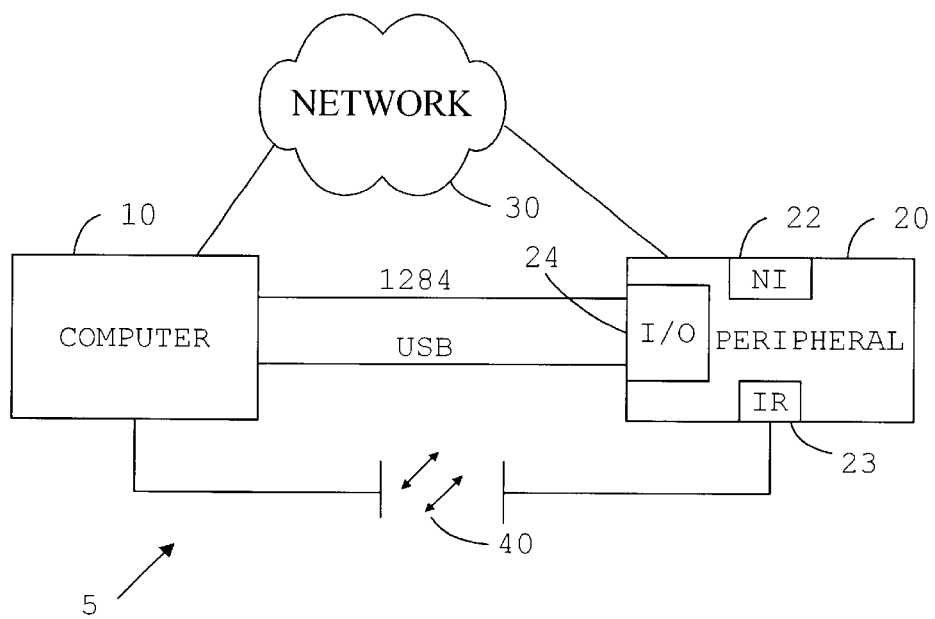
FIG. 1 is a block diagram showing the environment in which the present invention operates.

The preferred embodiment multiplexes the USB signals onto the IEEE 1284 signals thereby allowing a single connector on the device, thus saving space and cost while still allowing the device to support both communication protocols. Referring first to FIG. 1, there is shown a typical computer system 5 consisting of a computer 10 and a single peripheral device 20. As shown, computer 10 may communicate with peripheral device by way of a network 30, IR 40, 1284, or USB. Inside of the peripheral device 20 network communication is handled by a Network Interface (NI 22), while IR communication is handled by IR 23. I/O port 24 handles both 1284 and USB communication. It should be noted that the peripheral device may or may not support Network or IR modes of communication. It should also be understood that a peripheral device does not need to support simultaneous use of the USB and 1284 ports.

Figure 2:
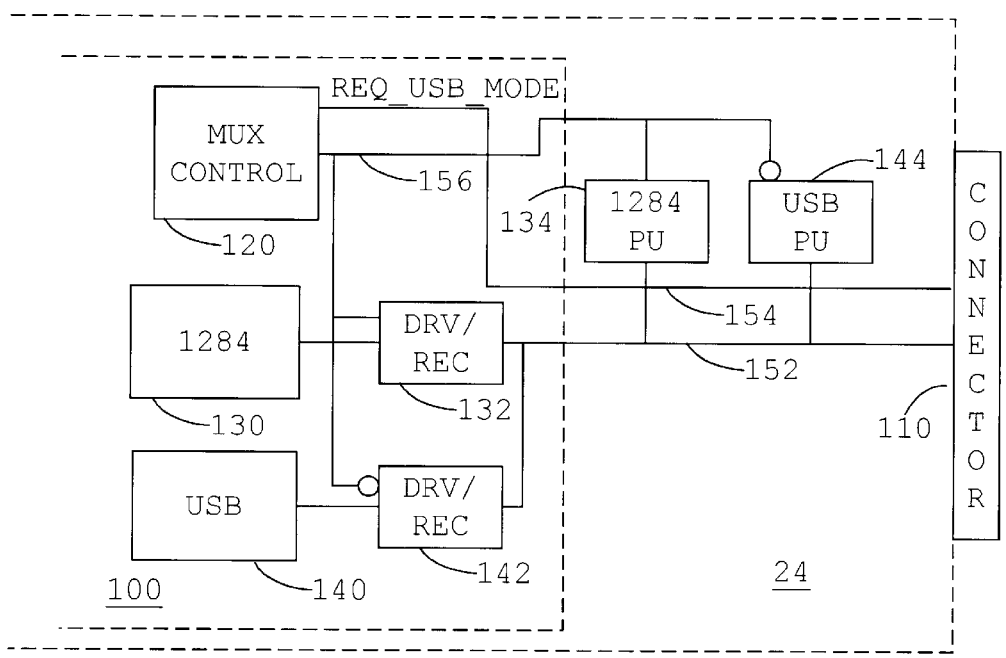
FIG. 2 is a block diagram showing some of the internal workings of the I/O block from FIG. 1.

Referring next to FIG. 2 there is shown the I/O interface 24 in greater detail. ASIC 100 interfaces the remainder of the peripheral device (not shown) to connector 110. Connector 110, which conforms to the IEEE 1284 requirements, in turn interfaces the peripheral device 20 to the computer 10. If an IEEE-1284 cable is connected to connector 110, then ASIC 100 configures Peripheral Device 20 to use the IEEE-1284 protocol. Alternatively, if a passive USB adapter, as described below, is connected to connector 110, then ASIC 100 configures Peripheral Device 20 to use the USB protocol.

Looking at FIG. 2 in detail, ASIC 100 has logic blocks 130 and 140 that support the IEEE 1284 and USB protocols respectively. On skilled in the art can create blocks 130 and 140 without undue experimentation. Therefore the internal workings of blocks 130 and 140 are not described herein. Communication signals for these logic blocks are multiplexed in the ASIC 100 onto the desired ASIC pins 152 by their respective Driver/Receiver (transceiver) 132 and 142. Each pin that must be multiplexed has two associated driver/receiver blocks. One driver/receiver pair for the USB mode and the other is for the IEEE-1284 mode. The need for different drivers and receivers arises from the fact that the USB and IEEE-1284 specifications call for different driver/receiver characteristics. Multiplexer Control Block 120 controls the multiplexing of the USB and IEEE-1284 signals by selecting the correct driver/receiver pair. The Multiplexer Control Block 120 also has one or more signals 156 that are outputs. Output signal 156 is used to control the signal conditioner pull-up resistor blocks 134 and 144. Because of differences in the IEEE-1284 and USB specifications, different pull-up resistors are needed.

The Multiplexer Control Block 120 decides which mode to select based on the nREQ_USB_MODE signal 154. nREQ_USB_MODE signal 154 is connected to the PERIPHERAL LOGIC HIGH signal on the IEEE-1284 connector 110. When nothing is connected to connector 110 or if a 1284 cable is connected to connector 110, PERIPHERAL LOGIC HIGH signal is high signaling ASIC 100 to enable the IEEE-1284 protocol. Alternatively, if the USB adapter is connected to connector 110, the PERIPHERAL LOGIC HIGH is pulled low signaling ASIC 100 to enable the USB protocol. The Multiplexer Control Block 120 can be realized by several techniques such as combinatorial logic, software/firmware in a processor or a hardware/software state machine. In the preferred embodiment, the Multiplexer Control Block is realized by a state machine. State machine operation of the Multiplexer Control Block 120 is described in the state diagram of FIGS. 4 and 3.

Figure 3:
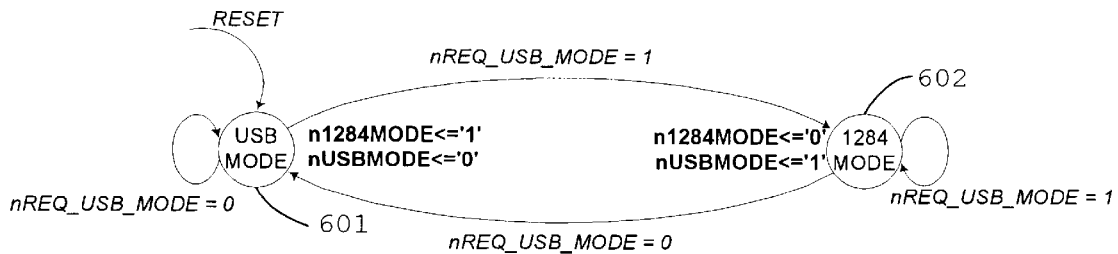
FIG. 3 is a state diagram of the preferred embodiment for the Multiplexer Control Block.

Referring to FIG. 3 where the preferred embodiment of the state diagram for Multiplexer Control Block 120 is shown. The state diagram of FIG. 3 uses the PERIPHERAL LOGIC HIGH signal to select the proper mode. The USB MODE state 601 is entered after receiving a RESET signal. In the USB MODE state 601 the nUSBMODE signal from the ASIC is set to a logical zero and the n1284MODE signal from the ASIC is set to a logical one. By setting the mode signals, the peripheral device is configured to use the USB protocol. As long as nREQ_USB_MODE remains a logical zero, the Multiplexer Control Block 120 remains in the USB MODE state 601. If nREQ_USB_MODE changes to a logical one then the Multiplexer Control Block 120 enters the 1284 MODE state 602. Upon entering the 1284 MODE state 602, the nUSBMODE signal from the ASIC is set to a logical one and the n1284MODE signal from the ASIC is set to a logical zero thereby configuring the peripheral device to use the IEEE-1284 protocol. As long as nREQ_USB_MODE remains a logical one, the Multiplexer Control Block 120 remains in the 1284 MODE state 602.

Figure 4:
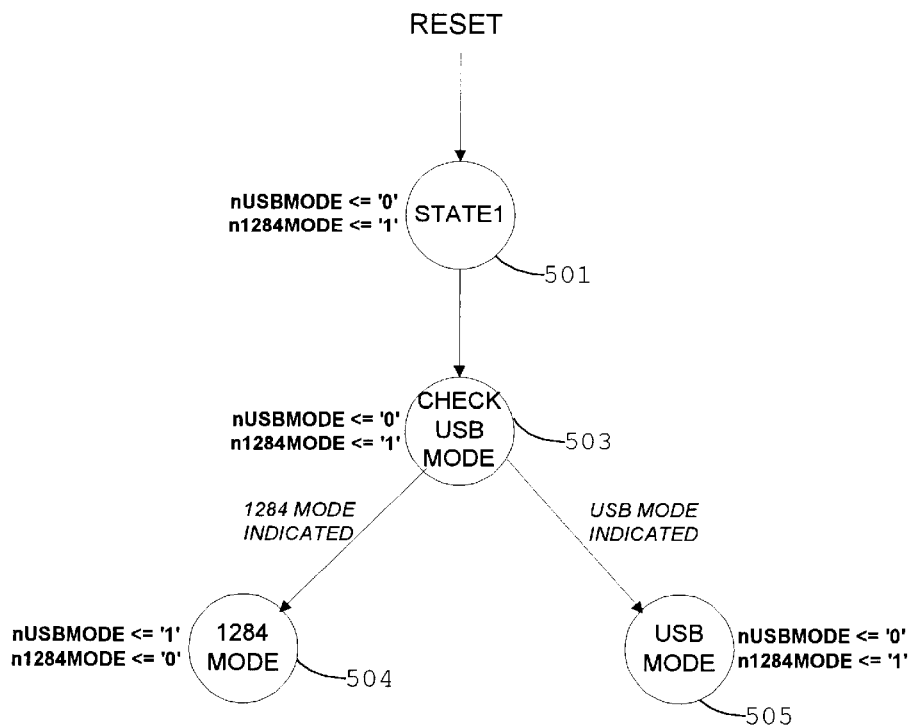
FIG. 4 is a state diagram of an alternate embodiment for the Multiplexer Control Block.

Referring to FIG. 4 where an alternative embodiment of a state diagram for Multiplexer Control Block 120 is shown. State 1 501 is entered after receiving a RESET signal. During the reset period, the nUSBMODE signal from the ASIC is set to a logical zero and the n1284MODE signal from the ASIC is set to a logical one. By setting the mode signals, the peripheral device is configured to use the USB protocol. The Multiplexer Control Block 120 enters the CHECK USB MODE state 503. If USB mode is indicated, then the USB MODE state 505 is entered. In the alternative, if the 1284 mode is indicated, then the 1284 MODE state 504 is entered.

Figure 5:
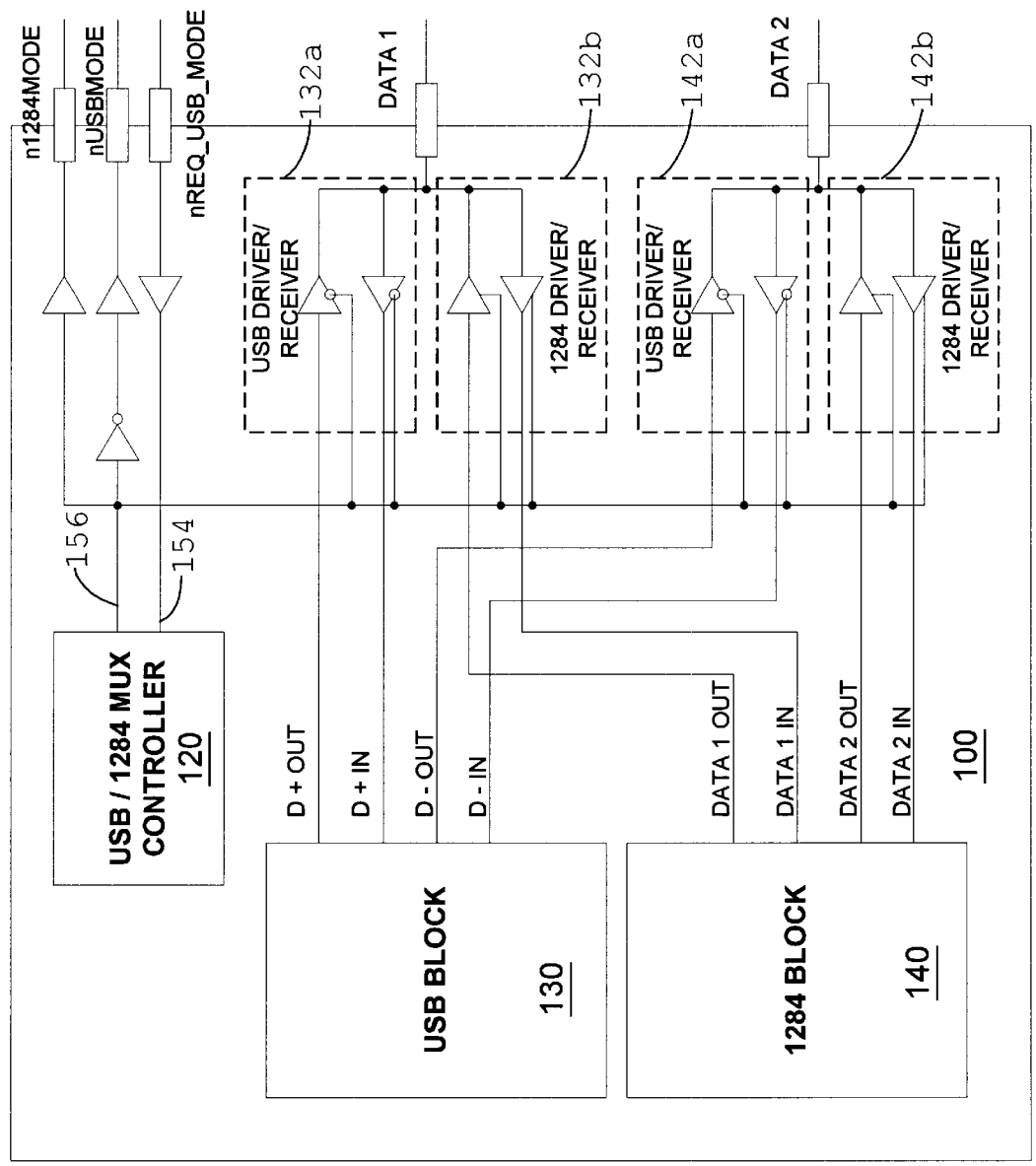
FIG. 5 is a block diagram showing some of the driver/receiver blocks in more detail.

Referring next to FIG. 5. A more detailed view of the Driver/Receiver is shown. Before describing the details of this figure, some things should be understood. First, for sake of clarity, all of the IEEE-1284 signals are not shown. Also, directional and tristate control functions for each driver/receiver pair are implied but not shown. Finally, the USB signals are shown as being multiplexed onto IEEE-1284 signals Data 1 and Data 2. Other IEEE-1284 signals could also be used.

Based on the state of Mode signal 156 from Multiplexer Control Block 120, either Driver/Receiver (transceiver) pair 132a and 142a or 132b and 142b are enabled. In particular, if Multiplexer Control Block 120 selects the USB mode, Driver/Receiver pair 132a and 142a are activated thereby connecting the USB Block 130 to DATA 1 and DATA 2 pins in the ASIC. Similarly, if Multiplexer Control Block 120 selects the 1284 mode, Driver/Receiver pair 132b and 142b are activated thereby connecting data 1 and data 2 from the 1284 Block 140 to DATA 1 and DATA 2 pins in the ASIC.

Figure 6:
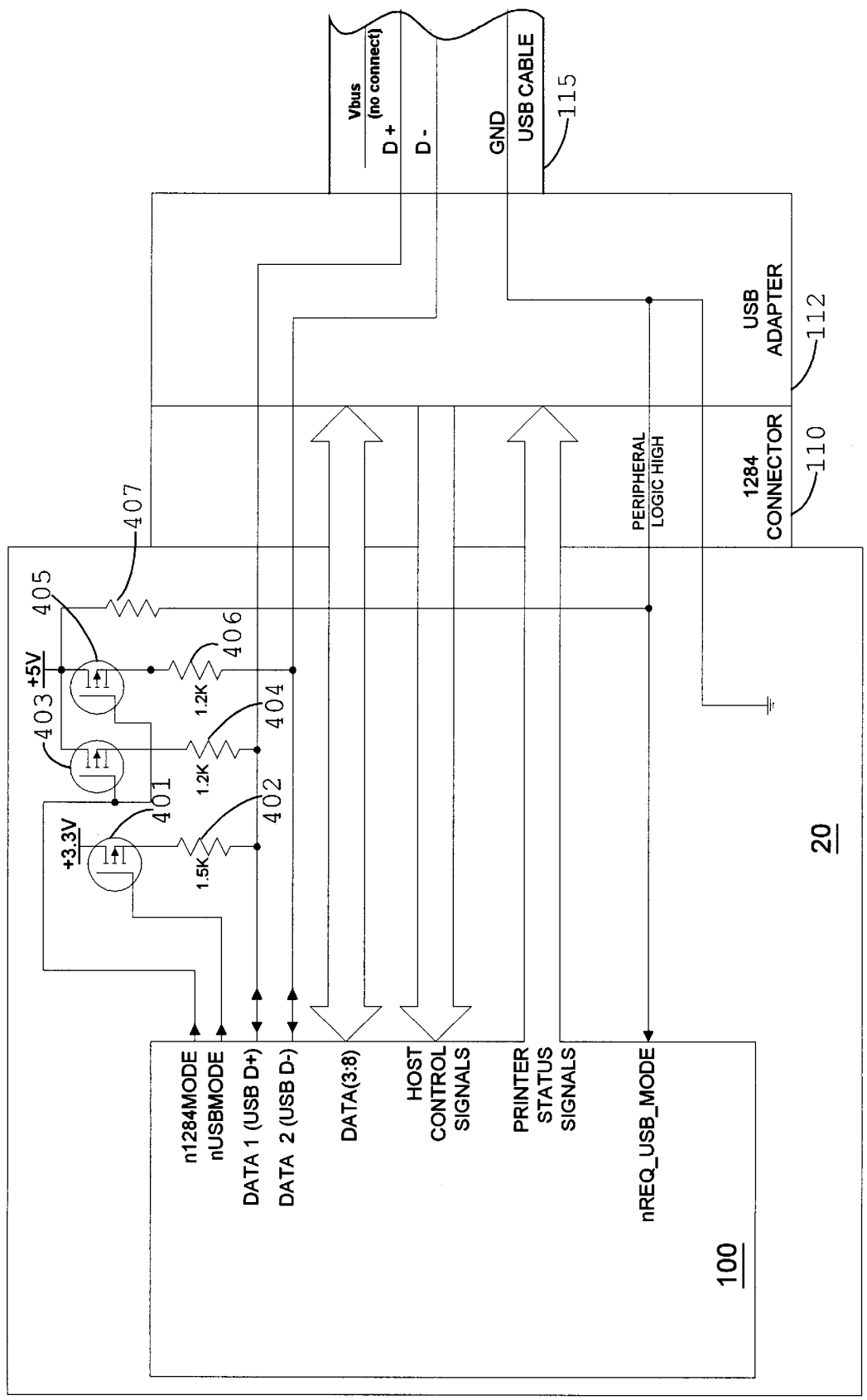
FIG. 6 is a block diagram showing the pull-up blocks in more detail.

Referring now to FIG. 6 where the details of the signal conditioner blocks are shown. When Multiplexer Control Block 120 selects USB mode, the ASIC 100 sets nUSBMODE low and n1284MODE high. The low on nUSBMODE turns on FET 401 enabling the 1.5K pull-up resistor 402. When Multiplexer Control Block 120 selects 1284 mode, the ASIC 100 sets nUSBMODE high and n1284MODE low. The low on n1284MODE turns on FETs 403 and 405 enabling the 1.2K pull-up resistors 404 and 405. Finally, resistor 407 is a pull-up for the PERIPHERAL LOGIC HIGH signal. Not shown in FIG. 6 are serial resistors on the signal lines. These resistors, as known in the art, are generally between the driver and the pull-up resistors. The 1284 and USB specify difference series resistance. By adjusting the series resistance of the internal drivers, a single external series resistor can be used for both protocols, thereby simplifying the design.

Visible in FIG. 6 is the passive USB adapter 112. This adapter converts the USB cable 115 to the 1284 connector 110 by jumpering the appropriate connections. The adapter also must pull the PERIPHERAL LOGIC HIGH signal low to indicate to the peripheral device 20 to use the USB mode. From the above description, one can see that the USB adapter is inexpensive, containing only two connectors and three jumper wires.

Figure 7:
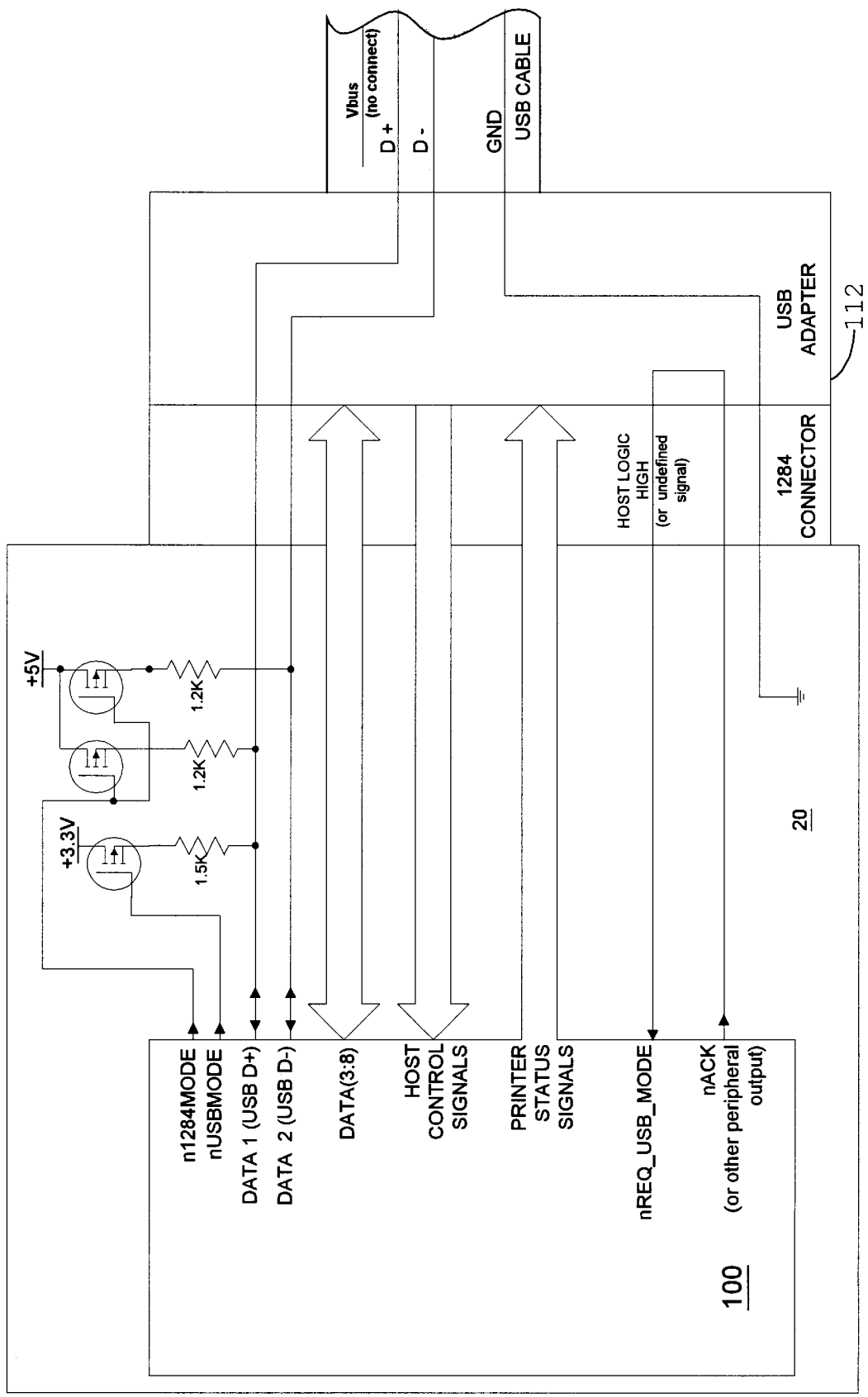
FIG. 7 is a block diagram showing an alternate embodiment for sensing the presence of the USB adapter.

An alternate embodiment of the present invention is shown in FIG. 7. Here the HOST LOGIC HIGH signal, or an undefined pin on the connector, is used as the input signal nREQ_USB_MODE. The signal is then shorted to one of the peripheral outputs, such as nACK, in the USB adapter 112. The Multiplexer Control Block 120 toggles the nACK signal and by observing the nREQ_USB_MODE signal can determine if the USB adapter is attached. One skilled in the art will understand after having read the above that there are other means of sensing which mode to operate not described.

Figure 8:
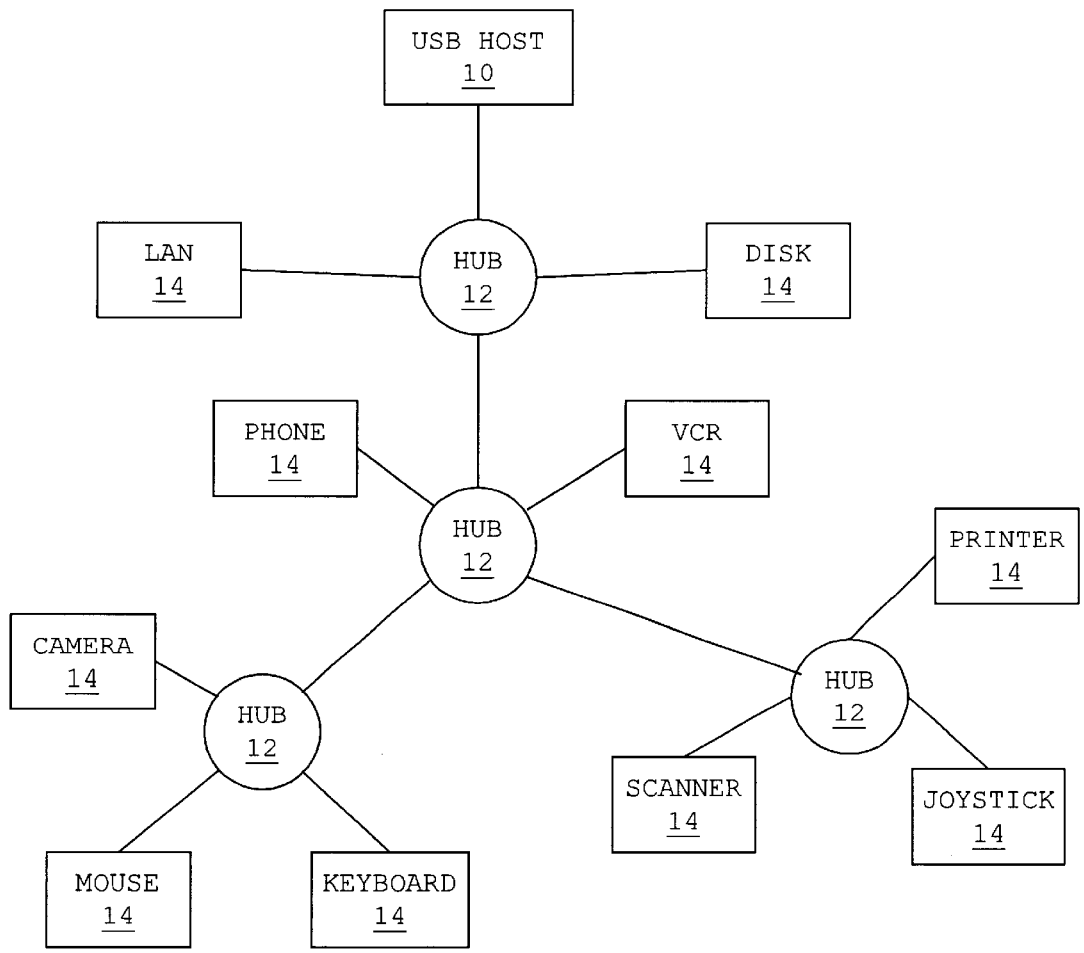
FIG. 8 illustrates the interconnection of various USB devices and hubs to a USB Host Computer.

Referring now to FIG. 8 a USB configuration is illustrated. A USB host controller 10 (e.g., a host personal computer) controls a plurality of interconnected USB devices 14 and USB hubs 12. The Universal Serial Bus standard provides a high-speed digital interconnection between the host controller 10 and the various hubs 12 and devices 14. A Universal Serial Bus is capable of replacing traditional serial, parallel, SCSI and other device interfaces on a personal computer. Instead of using a separate interface card or interface controller for each interface, USB provides having the capacity to attach numerous USB devices to a single USB port.

In a typical universal serial bus configuration, such as the configuration shown in FIG. 8, USB host controller 10 controls the operation of the USB by transmitting tokens and commands to the attached USB hubs 12 and USB peripheral devices 14. The tokens and commands issued by the host controller give permission to specific peripheral devices allowing them to transmit commands and/or data on the USB. A USB peripheral device may exchange data with the host controller directly or with another USB peripheral device connected to the USB. For example, a mouse or keyboard may generate data which is transmitted across the USB to a personal computer acting as the USB host controller. Similarly, the personal computer may transmit data across the USB to a printer or disk drive connected to the USB. In another situation, the USB host controller may control the communication of data between two USB peripheral devices. For example, a camera or camcorder may capture and transmit images across the USB to a disk drive or VCR for storage. In this example, the host controller or personal computer is not the destination of the image data directly, but does control the flow of data between the two peripheral devices.

The USB topology includes both "upstream" and "downstream" directions. For example, host controller 10 shown in FIG. 8 has a downstream direction which is connected to a hub 12. Host controller 10 has no upstream direction because the controller is the master of the USB. Similarly, each USB device 14 has an upstream direction, but no downstream direction because conventional USB devices are not capable of acting as a USB master. Hubs 12 have both upstream and downstream directions. A single port on each hub 12 is designated as a "privileged port" indicating the connection to the upstream device; i.e., the master device or a another USB hub. The remaining ports in each hub are used to attach USB devices 14 in the downstream direction. Hubs 12 provide two different functions in the USB topology. First, the hubs consolidate data flowing into the hub from downstream USB devices, and transmit the data to the upstream device (a host controller or another hub). Additionally, each hub distributes data arriving from an upstream source to all connected downstream USB devices 14 and downstream hubs 12.

In a USB configuration, the USB host controller automatically identifies the existence of a new peripheral device or hub when it is attached to the USB. The host controller then queries the Read-Only Memory (ROM) or other storage device within the peripheral device 14 which contains identifying information such as device type, manufacturer, etc. As mentioned above, all USB control signals are generated by the host controller 10. Typical USB devices 14 are not capable of operating as USB masters, and instead operate only as USB slaves.

Figure 9:
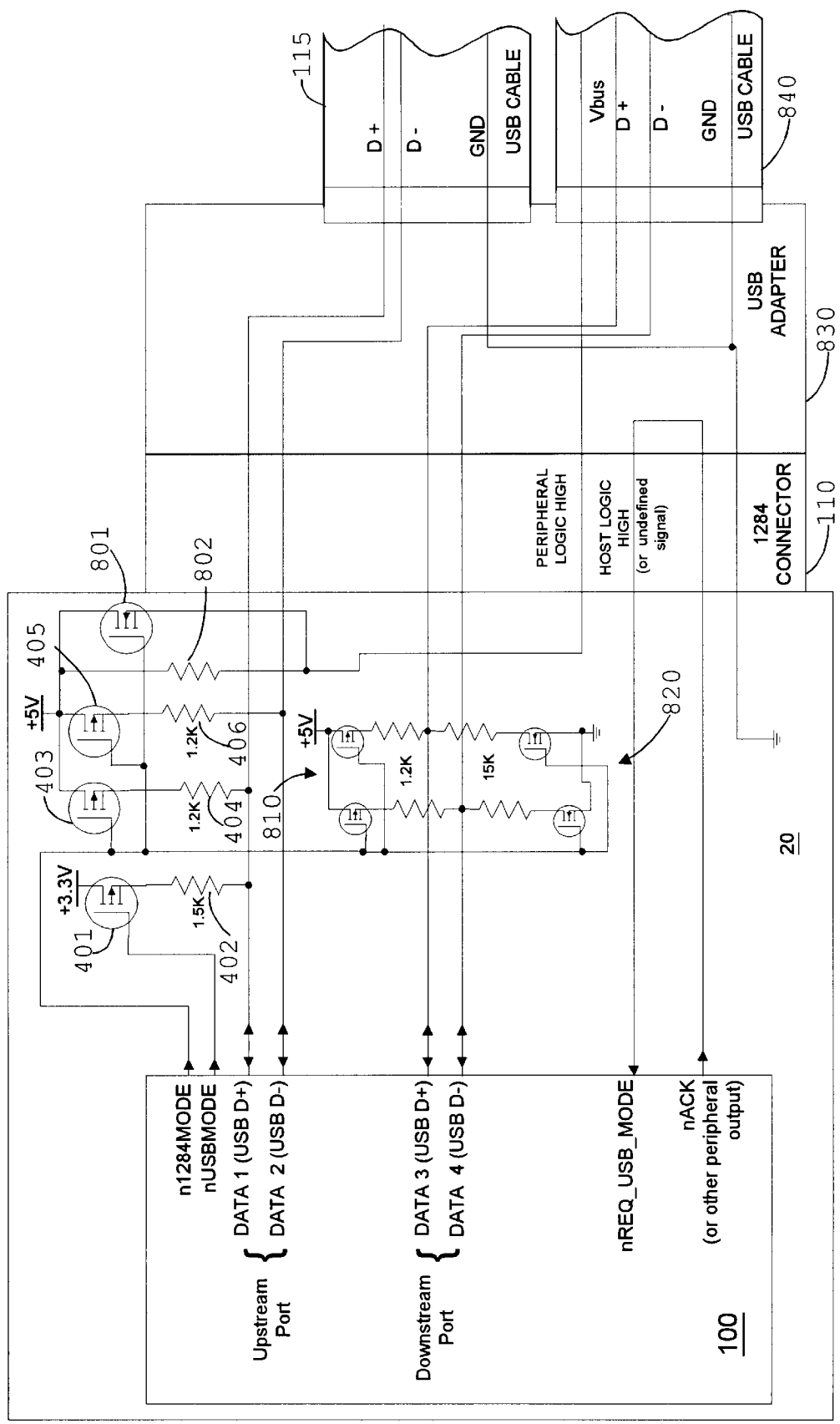
FIG. 9 is a block diagram showing an alternate embodiment that allows the peripheral device to operate as a USB hub.

The invention described above may be extended to allow the IEEE1284 port to used as a USB hub as shown in FIG. 9. Data lines 1 and 2 are used for the upstream port as in FIG. 6. Additional data lines 3 and 4 are used to provide downstream port. While not shown, ASIC 100 must include a pair of Driver/Receives similar to those shown in FIG. 5 for data lines 3 and 4.

When USB adapter 830 is attached to connector 110, ASIC 100 sets nUSBMODE low and n1284MODE high. The low on nUSBMODE turns on FET 401 thereby enabling the 1.5K pull-resistor 402 as described above. The high n1284MODE signal turns off FETs 403 and 405 as describe above, however n1284MODE also turns off FETs 810 and turns on FETs 820 thereby providing proper termination. Optional FET 801, which is also turned on by n1284MODE, provides power to the downstream port. Although only one downstream port is shown in FIG. 9, other signal lines may be used to provide additional downstream ports.

Although the preferred embodiment of the invention has been illustrated, and that form described, it is readily apparent to those skilled in the art that various modifications may be made therein without departing from the spirit of the invention or from the scope of the appended claims. For example, the above description only described the use of the present invention in a peripheral device. Such description is not intended to limit the present invention device because it my also be used by the computer 10. The above description also described the present invention as using an ASIC 100. One skilled in the art will understand that the functions contained in the ASIC 100 may alternatively be implemented by readily available discrete components.

What is claimed is:

1. An apparatus for providing a first protocol and a second protocol in a device, said apparatus comprising:

a connector having a configuration as defined by the first protocol;

a signal conditioner connected to the connector;

a first protocol block connected to the signal conditioner;

a second protocol block connected to the signal conditioner;

a passive adapter having a first connector adapted to mate with the connector and a second connector configured as defined by the second protocol, the first connector routing a protocol signal from the connector back to the connector when the passive adapter is connected to the connector; and a controller means sensing the absence of the protocol signal, enabling the first protocol block and configuring the signal conditioner for the first protocol, in the alternative, the controller means receiving the protocol signal, enabling the second protocol block and configuring the signal conditioner for the second protocol.

2. The apparatus of claim 1 wherein the first protocol block further comprising a first transceiver connected to the signal conditioner.

3. The apparatus of claim 1 wherein the second protocol block further comprising a second transceiver connected to the signal conditioner.

4. The apparatus of claim 1 wherein the passive adapter further comprising a third connector having a configuration as defined by the second protocol, the third connector being collocated with the second connector.

5. An apparatus for providing a first interface and a second interface on a device, said apparatus comprising:

- a connector having a configuration as defined by the first interface;
- a signal conditioner connected to the connector;
- a first transceiver connected to the signal conditioner;
- a second transceiver connected to the signal conditioner
- a first interface protocol block means for communication external to the device using a first protocol, the first interface protocol block being connected to the first transceiver;
- a second interface protocol block means for communication external to the device using a second protocol, the second interface protocol block being connected to the second transceiver;
- a passive adapter having a first side adapted to mate with the connector and further having a second side having a configuration as defined by the second interface; and
- a controller means for sensing the presence of the passive adapter, when the controller means senses the absence of the passive adapter, the controller means enabling the first transceiver and first interface protocol block means and configuring the signal conditioner for the first interface, in the alternative, when the controller means senses the presence of the passive adapter, the controller means enabling the second transceiver and second interface protocol block means and configuring the signal conditioner for the second interface.

6. The apparatus of claim 5 wherein the passive adapter is external to the device.

7. The apparatus of claim 6 wherein the passive adapter further comprising an indicator means for indicating to the controller means that the passive adapter is connected to the connector.

8. The apparatus of claim 7 wherein the passive adapter further comprising a second configuration on the second side, the second configuration having a configuration as defined by the second protocol.

9. The apparatus of claim 8 further comprising a power signal connected to the connector and routed to the second configuration when the passive adapter is attached to the connector.

10. A method for providing a first protocol and a second protocol through a common connector in a device, the method comprising the steps of:

- providing a presence signal at the common connector;
- if a passive adapter is connected to the common connector then the passive adapter looping the presence signal back into the common connector as the protocol signal;
- if the protocol signal is present at the common connector then enabling a first protocol block and conditioning signals from the first protocol block to conform to the first protocol; and
- in the absence of the protocol signal, enabling a second protocol block and conditioning signals from the second protocol block to conform to the second protocol.

11. The method of claim 10 further comprising the steps of:

- if the protocol signal is present then enabling a third transceiver; and
- providing power to the common connector.

* * * * *